United States Patent [19]

Sordillo et al.

[11] Patent Number: 4,806,009
[45] Date of Patent: Feb. 21, 1989

[54] NOSE PAD

[75] Inventors: Vincent F. Sordillo, Greenville, R.I.; Arthur R. Hilsinger, Jr., Needham, Mass.

[73] Assignee: The Hilsinger Corporation, Plainville, Mass.

[21] Appl. No.: 155,975

[22] Filed: Feb. 16, 1988

[51] Int. Cl.$^4$ .......................... G02C 5/02; G02C 5/12
[52] U.S. Cl. ..................................... 351/88; 351/132; 351/137
[58] Field of Search ..................... 351/80, 88, 76, 132, 351/138, 77, 78, 79, 81, 82, 131, 136, 137, 139

[56] References Cited

U.S. PATENT DOCUMENTS 2,144,165  1/1939  Page ........................................ 351/76

Primary Examiner—Rodney B. Bovernick
Attorney, Agent, or Firm—Barlow & Barlow, Ltd.

[57] ABSTRACT

A nose pad has an attachment member for affixation to a pad arm that comprises an apertured plate with a pair of upstanding prongs. The prongs are arranged to engage in a necked portion of the pad arm and the prongs are arranged so that the necked portion may be inserted and twisted in place without the use of any special tools.

4 Claims, 1 Drawing Sheet

NOSE PAD

BACKGROUND OF THE INVENTION

There has been a long felt need for a non corrosive nose pad and while nose pads have heretofore been made of non-metallic material, they have had imbedded therein some form of metal reinforcement and generally the metal reinforcement has a portion which protrudes from the non-metallic nose pad so as to provide an attachment to the nose pad arm. With this form it has also been necessary to utilize pliers or like tools to attach nose pads to the nose pad arms.

There is also a further problem in eyeglass wear, namely the support of the glasses on the nose in a manner to allow the wearer maximum comfort. The introduction of silicone into the marketplace has increased the comfort but has introduced another problem in that the skin oils migrate on silicone and badly corrode metal attachment fixtures.

Some of the proposals for utilizing non-metallic nose pads with portions that protrude therefrom or interlocking with the nose pad arm are seen for example in U.S. Pat. No. 2,080,853, by Nelson, where essentially a loop protrudes from the pad and the arm has a bifurcated snap-in engagement with the loop. A further arrangement that has been proposed is seen in German published patent application No. 28-35116 (published Feb. 14, 1980) which nose pad has protruding from the rear face thereof a bifurcated portion that snaps into a particularly shaped nose pad arm that has a mating loop and which is essentially a reverse structure of that seen in the above mentioned Nelson patent. There has not, however, been a nose pad formed entirely of non-metallic material.

SUMMARY OF THE INVENTION

The principal object of the present invention is to provide an improved nose pad entirely of plastic for the nose support of a spectacle frame and one by which the assembly to the arm is greatly simplified. To carry out this object there is provided a deformable nose pad that has a nose pad arm attachment member molded therein. The attachment member is essentially an apertured plate with a pair of upstanding resilient prongs that protrude from the rear face of the nose pad which prongs have inturned ends. The nose pad cooperates with a nose pad arm that has a necked portion which necked portion is received between the upstanding prongs, the prongs grasping the necked portion while the inturned ends resist dislodgement of the pad from the pad arm. In the preferred embodiment, the nose pad body is molded of a silicone plastic material which has a durometer on the order of 50 on the Shore A scale. The shape of the protrusions and the particular shape of the arm is such that by a simple twisting action, the two parts may be placed together without the utilization of any particular optical tools which is an advantage in the replacement field.

DESCRIPTION OF THE PREFERRED EMBODIMENT

Figure 1:
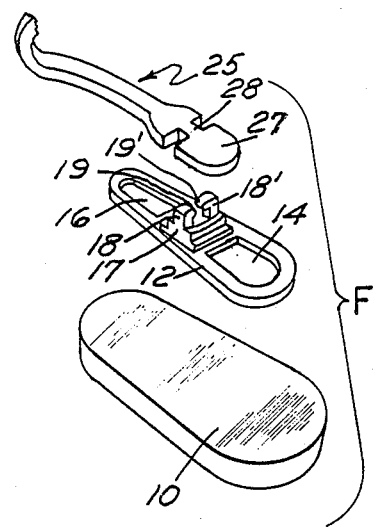
FIG. 1. is a detached perspective view of the nose pad assembly with a fragmental portion of the supporting nose pad arm.
Figure 2:
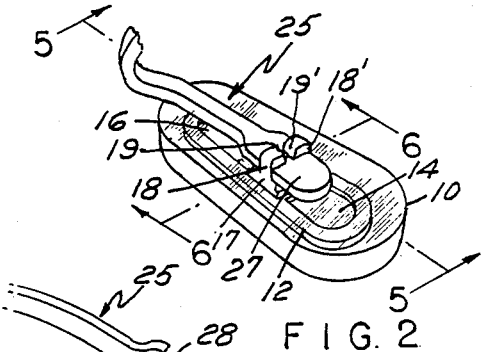
FIG. 2. is a perspective view of the assembled nosepad attached to a nosepad arm.
Figure 5:
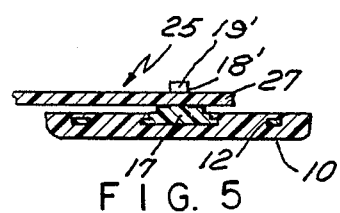
FIG. 5. is a sectional view taken on line 5—5 of FIG. 2.

The nose pad as seen in the drawings comprises a resilient portion as for example, a resilient pad portion 10. Within the pad there will be molded a plastic plate 12 which is provided with apertures 14 and 16 and which will centrally have a stepped platform 17 with a pair of upstanding prongs 18, 18' rising substantially vertically therefrom. Essentially, the portion 10 and the plate 12 are molded together in one piece so that as seen in FIGS. 2 through 6 there will be protruding from the rear face 11 of the nose pad, the prongs 18, 18'. It has been found that it is quite suitable to utilize a silicone plastic material for the nose pad 10 proper and this has a character of resilience and is very comfortable to wear, particularly when the silicone plastic has a durometer on the order of 50 on the Shore A scale. It will be noted that the pad is a homogeneous material which is "soft" and to provide uniform support, the plate 12 is preferably deformable polycarbonate material that has a substantial surface that is molded into the pad to give the pad the necessary support and yet retain the ability to conform to the nose of the wearer.

Figure 6:
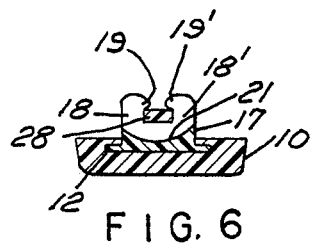
FIG. 6. is a sectional view taken on line 6—6 of FIG. 2.
Figure 4:
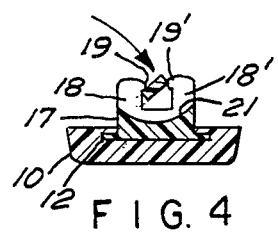
FIG. 4. is a sectional view taken on lines 4—4 of FIG. 3.

It will also be noted particularly by reviewing FIGS. 4 and 6, that the protruding prongs 18, 18', are formed so that they have an inwardly projecting end portions 19, 19' respectively so that when the pad is assembled to the arm, the inwardly directed portions 19, 19', overlie the nose pad arm.

Figure 3:
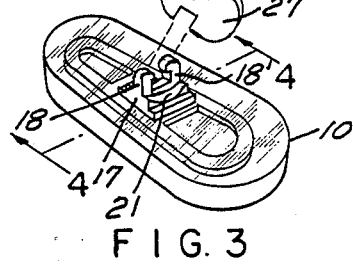
FIG. 3. is a perspective view showing a step in the assembly process.

Referring now to FIGS. 1 and 3, it will be seen that the nose pad arm generally designated 25 is formed with a paddle-shaped end 27 and substantially centrally of this paddle-shaped end 27 is a neck portion indicated at 28. When the necked portion is inserted in a generally vertical direction, as seen in the drawings, into the space between the prongs and twisted against one of the inturned ends 19 or 19'. As seen in FIGS. 3 and 4, one of the upstanding prongs 18 or 18', as the case may be, will be slightly deflected outwardly so as to allow the nose pad arm to be seated as seen in FIG. 6. Also to facilitate the insertion of the pad arm in between the prongs and twist the same, a portion of the mounting or back-up plate is cut away in an arc as at 21. It will be appreciated that the nose pad arm will be gripped and held in position by the portions 19, 19'. The arrangement is such that the lateral dimension of the necked portion at 28 is substantially equal to the distance between the upstanding prongs 18, 18', and it is this dimensioning that causes the prongs to initially deflect outwardly and being resilient they will spring back to their normal shape and grip the nose pad arm. The gripping is not so tight, however, that normal rocking of the nose pad is impeded.

From the above, it will be appreciated that the pad can be fitted to spectacles easily without the use of tools. Also the plastic prongs do not corrode and inhibit body oil migration to the pad arm.

We claim:

1. In spectacles in combination a nose pad arm with a necked portion, a deformable nose pad constructed of soft material having an anchor member comprising a plastic plate with a pair of upstanding resilient prongs molded into the soft pad material, the terminal ends of the prongs having inturned ends, the resiliency of the prongs grasping the said necked portion of the nose pad arm.

2. In an opthalmic mounting having a nose pad supporting arm, said arm having spaced enlargements between which is defined a neck portion, that improvement consisting of a pad having a soft deformable body with an embedded plate, said plate having a pair of prongs rising therefrom to protrude from the pad, said prongs having inturned ends and receiving therebetween the neck portion of the arm.

3. In a mounting as in claim 2 wherein said pad body is silicone and the plate and prongs are a plastic material.

4. A structure as in claim 1 or 2 wherein the plate and the prongs are a polycarbonate material.

* * * * *